(12) United States Patent
Ramaley et al.

(10) Patent No.: US 7,721,191 B2
(45) Date of Patent: *May 18, 2010

(54) FILE SAVE METHOD FOR HTML FILES USING RECOVERY FILES INCLUDING A LIST WITH TEMPORARY AND FINAL NAMES FOR REPLACEMENT FILES

(75) Inventors: Alan A. Ramaley, Seattle, WA (US);
Thomas W. Olsen, Issaquah, WA (US);
Darrell L. Aldrich, Redmond, WA (US);
David M. Buchthal, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1063 days.

This patent is subject to a terminal disclaimer.

(21) Appl. No.: 11/197,845

(22) Filed: Aug. 5, 2005

(65) Prior Publication Data
US 2006/0031265 A1 Feb. 9, 2006

Related U.S. Application Data

(63) Continuation of application No. 09/333,855, filed on Jun. 15, 1999, now Pat. No. 7,003,721.

(51) Int. Cl.
*G06F 7/00* (2006.01)
(52) U.S. Cl. .................. 715/229; 715/234; 707/202; 707/204
(58) Field of Classification Search .......... 715/202–204, 715/210, 200, 229, 234
See application file for complete search history.

(56) References Cited

U.S. PATENT DOCUMENTS 5,276,860 A * 1/1994 Fortier et al. ............... 714/6

(Continued)

OTHER PUBLICATIONS

Kelly, S.B, hereinafter Kelly, Mastering WordPerfect, pp. 284-288 (Sybex, 1987).*
Hart-Davis, G., hereinafter Davis, "The ABCs of Word 97", Sybex, 1997, chapter 20, and pp. 8-15.*

(Continued)

*Primary Examiner*—Cesar B Paula
(74) *Attorney, Agent, or Firm*—Merchant & Gould P.C.

(57) ABSTRACT

A computer-implemented process for replacing old files having old names on a permanent storage medium with new files in volatile memory. Some of these files may be opaque files, which are old files that have become new files without undergoing any changes, other than possibly name changes. The primary steps of this replacement can comprise first saving the non-opaque new files onto the permanent storage medium and assigning them temporary filenames. An opaque recovery file listing the old name and a temporary name for each opaque file is created. A primary recovery file listing the temporary name and a final name for each new file is created. After the names of the opaque files are changed to their temporary names, the names of the non-opaque old files are changed from their old names to backup names. Then, the names of the new files are changed from their temporary names to their final names. The recovery files and the old files can be deleted. If an event leaves the program performing the primary steps in control but unable to complete the replacement, then the old files can be restored to the permanent storage medium. If an event prevents completion of either a replacement attempt or a restoration of the old files, completion of the replacement can again be attempted at a later time using the recovery files. The described processes can be applied to saving HTML documents, each of which typically comprises multiple files.

15 Claims, 8 Drawing Sheets

U.S. PATENT DOCUMENTS

| | | | | |
|---|---|---|---|---|
| 5,278,982 | A | * | 1/1994 | Daniels et al. .............. 707/202 |
| 6,078,999 | A | * | 6/2000 | Raju et al. ................. 711/161 |
| 6,195,695 | B1 | * | 2/2001 | Cheston et al. ............. 709/221 |
| 6,226,651 | B1 | * | 5/2001 | Masuda et al. .............. 707/202 |
| 6,292,808 | B1 | * | 9/2001 | Obermarck et al. ......... 707/202 |
| 6,374,265 | B1 | * | 4/2002 | Chen et al. ................. 707/204 |

OTHER PUBLICATIONS

Method of Providing a Shadow Version ("Backup Copy") of a File Before Editing It and Providing a Way for an "Unlimited Amount of Backup Copies" Interactively in a Single Session, IBM TDB, vol. 30, No. 8, pp. 210-212, Jan. 1, 1988.*

Timely Policy-Based Event-Driven Backups of Critical Files, IBM TDB, vol. 39, No. 4, pp. 127-130, Apr. 1, 1996.*

* cited by examiner

| STEP 205 | STEP 210 | STEP 215 | STEP 220 |
|---|---|---|---|
| BOOK1.HTM | BOOK1.HTM | BOOK1.HTM | BOOK1.HTM |
| EDITDATA.MSO | EDITDATA.MSO | EDITDATA.MSO | EDITDATA.MSO |
| STYLESHEET.CSS | STYLESHEET.CSS | STYLESHEET.CSS | STYLESHEET.CSS |
| TABSTRIP.HTM | TABSTRIP.HTM | TABSTRIP.HTM | TABSTRIP.HTM |
| SHEET001.HTM | SHEET001.HTM | SHEET001.HTM | SHEET001.HTM |
| IMAGE001.PNG | IMAGE001.PNG | IMAGE001.PNG | IMAGE001.PNG |
| IMAGE002.GIF | IMAGE002.GIF | IMAGE002.GIF | IMAGE002.GIF |
| IMAGE003.PNG | IMAGE003.PNG | IMAGE003.PNG | IMAGE003.PNG |
| IMAGE004.JPG | IMAGE004.JPG | IMAGE004.JPG | IMAGE004.JPG |
| IMAGE005.PNG | IMAGE005.PNG | IMAGE005.PNG | IMAGE005.PNG |
| IMAGE006.GIF | IMAGE006.GIF | IMAGE006.GIF | IMAGE006.GIF |
| SHEET002.HTM | SHEET002.HTM | SHEET002.HTM | SHEET002.HTM |
| SHEET003.HTM | SHEET003.HTM | SHEET003.HTM | SHEET003.HTM |
| FILELIST.XML | FILELIST.XML | FILELIST.XML | FILELIST.XML |
| | | | |
| | BOOK1.HT_ | BOOK1.HT_ | BOOK1.HT_ |
| | EDITDATA.MS_ | EDITDATA.MS_ | EDITDATA.MS_ |
| | STYLESHEET.CS_ | STYLESHEET.CS_ | STYLESHEET.CS_ |
| | TABSTRIP.HT_ | TABSTRIP.HT_ | TABSTRIP.HT_ |
| | SHEET001.HT_ | SHEET001.HT_ | SHEET001.HT_ |
| | SHEET002.HT_ | SHEET002.HT_ | SHEET002.HT_ |
| | SHEET003.HT_ | SHEET003.HT_ | SHEET003.HT_ |
| | FILELIST.XM_ | FILELIST.XM_ | FILELIST.XM_ |
| | | | |
| | | BOOK1.RC_ | BOOK1.RC_ |
| | | | BOOK1.REV_ |

*FIG. 3A*

| STEP 225 | STEP 230 | STEP 235 | STEP 240 |
|---|---|---|---|
| BOOK1.HTM | BOOK1.HTM | BOOK1.HT~ | BOOK1.HT~ |
| EDITDATA.MSO | EDITDATA.MSO | EDITDATA.MSO | EDITDATA.MSO |
| STYLESHEET.CSS | STYLESHEET.CSS | STYLESHEET.CSS | STYLESHEET.CSS |
| TABSTRIP.HTM | TABSTRIP.HTM | TABSTRIP.HTM | TABSTRIP.HTM |
| SHEET001.HTM | SHEET001.HTM | SHEET001.HTM | SHEET001.HTM |
| IMAGE001.PNG | IMAGE001.PNG | IMAGE001.PNG | IMAGE001.PNG |
| IMAGE002.GIF | IMAGE002.GIF | IMAGE002.GIF | IMAGE002.GIF |
| IMAGE001.PN_ | IMAGE001.PN_ | IMAGE001.PN_ | IMAGE001.PN_ |
| IMAGE002.JP_ | IMAGE002.JP_ | IMAGE002.JP_ | IMAGE002.JP_ |
| IMAGE003.PN_ | IMAGE003.PN_ | IMAGE003.PN_ | IMAGE003.PN_ |
| IMAGE004.GI_ | IMAGE004.GI_ | IMAGE004.GI_ | IMAGE004.GI_ |
| SHEET002.HTM | SHEET002.HTM | SHEET002.HTM | SHEET002.HTM |
| SHEET003.HTM | SHEET003.HTM | SHEET003.HTM | SHEET003.HTM |
| FILELIST.XML | FILELIST.XML | FILELIST.XML | FILELIST.XML |
|  |  |  |  |
| BOOK1.HT_ | BOOK1.HT_ | BOOK1.HT_ | BOOK1.HTM |
| EDITDATA.MS_ | EDITDATA.MS_ | EDITDATA.MS_ | EDITDATA.MS_ |
| STYLESHEET.CS_ | STYLESHEET.CS_ | STYLESHEET.CS_ | STYLESHEET.CS_ |
| TABSTRIP.HT_ | TABSTRIP.HT_ | TABSTRIP.HT_ | TABSTRIP.HT_ |
| SHEET001.HT_ | SHEET001.HT_ | SHEET001.HT_ | SHEET001.HT_ |
| SHEET002.HT_ | SHEET002.HT_ | SHEET002.HT_ | SHEET002.HT_ |
| SHEET003.HT_ | SHEET003.HT_ | SHEET003.HT_ | SHEET003.HT_ |
| FILELIST.XM_ | FILELIST.XM_ | FILELIST.XM_ | FILELIST.XM_ |
|  |  |  |  |
| BOOK1.RC_ |  |  |  |
| BOOK1.REV | BOOK1.REV | BOOK1.REV | BOOK1.REV |

*FIG. 3B*

| STEP 245 | STEP 250 | STEP 255 | STEP 260 |
|---|---|---|---|
| BOOK1.HT~ | BOOK1.HT~ | | |
| EDITDATA.MS~ | EDITDATA.MS~ | | |
| STYLESHEET.CS~ | STYLESHEET.CS~ | | |
| TABSTRIP.HT~ | TABSTRIP.HT~ | | |
| SHEET001.HT~ | SHEET001.HT~ | | |
| IMAGE001.PN~ | IMAGE001.PN~ | | |
| IMAGE002.GI~ | IMAGE002.GI~ | | |
| IMAGE001.PN_ | IMAGE001.PNG | IMAGE001.PNG | IMAGE001.PNG |
| IMAGE002.JP_ | IMAGE002.JPG | IMAGE002.JPG | IMAGE002.JPG |
| IMAGE003.PN_ | IMAGE003.PNG | IMAGE003.PNG | IMAGE003.PNG |
| IMAGE004.GI_ | IMAGE004.GIF | IMAGE004.GIF | IMAGE004.GIF |
| SHEET002.HT~ | SHEET002.HT~ | | |
| SHEET003.HT~ | SHEET003.HT~ | | |
| FILELIST.XM~ | FILELIST.XM~ | | |
| | | | |
| BOOK1.HTM | BOOK1.HTM | BOOK1.HTM | BOOK1.HTM |
| EDITDATA.MS_ | EDITDATA.MSO | EDITDATA.MSO | EDITDATA.MSO |
| STYLESHEET.CS_ | STYLESHEET.CSS | STYLESHEET.CSS | STYLESHEET.CSS |
| TABSTRIP.HT_ | TABSTRIP.HTM | TABSTRIP.HTM | TABSTRIP.HTM |
| SHEET001.HT_ | SHEET001.HTM | SHEET001.HTM | SHEET001.HTM |
| SHEET002.HT_ | SHEET002.HTM | SHEET002.HTM | SHEET002.HTM |
| SHEET003.HT_ | SHEET003.HTM | SHEET003.HTM | SHEET003.HTM |
| FILELIST.XM_ | FILELIST.XML | FILELIST.XML | FILELIST.XML |
| | | | |
| | | | |
| BOOK1.REV | BOOK1.REV | BOOK1.REV | |

FILE SAVE METHOD FOR HTML FILES USING RECOVERY FILES INCLUDING A LIST WITH TEMPORARY AND FINAL NAMES FOR REPLACEMENT FILES

CROSS-REFERENCE TO RELATED APPLICATIONS

This patent application is a continuation of U.S. patent application Ser. No. 09/333,855 (NOW U.S. Pat. No. 7,003,721), entitled "Safe save method of HTML files using recovery files including a list with temporary and final names for replacement files" filed on Jun. 15, 1999 and assigned to the same assignee as this application. The aforementioned patent application is expressly incorporated herein, in its entirety, by reference.

FIELD OF THE INVENTION

The invention relates generally to saving a set of related files in a Computer system, and more specifically to replacing an old version of an HTML document on a permanent storage medium with a new version of an HTML document in volatile memory. This allows either the replacement of the old HTML document or the restoration of the old HTML document should the replacement attempt be disrupted.

BACKGROUND OF THE INVENTION

When a user modifies a document in a computer application, he or she usually wants to preserve those changes by replacing the old version of the document on a permanent storage medium, such as a hard drive or magnetic disk drive, with the new version of the document. Unfortunately, there exist many threats to the successful completion of this replacement. For example, the storage medium may run out of space, there could be a permission error, the computer might lose power, a network could go down, or the saving application could crash.

One way an application can save a document consisting of only one file is to save the file directly over the old document's file. If there is a failure at any point while the application is attempting to do this, however, the user ends up with a corrupted file that is a mix of bytes from the old file and bytes from the new file he or she was trying to save. If this happens, the user effectively loses both the old and the new versions of the document.

A way to reduce the possibility of this result is with a method, known as a "safe save", for saving a document consisting of only one file. This "safe save" method can be used when a user has an old version of a document on a permanent storage medium that he wishes to replace with a new version of the document located in volatile memory, such as random access memory (RAM). The method is triggered by the user informing the application that the user wishes to save the document. In the "safe save" method, the application first saves the new version of the document under a temporary name on the permanent storage medium. If the application fails at any point during this step, the user still has the old version of the document. If the application completes this step, then both the old version and the new version of the file are on the permanent storage medium. The final step is to change the name of the file saved on the permanent storage medium under a temporary name to the original name of the file. This step is relatively fast, so the chance of corruption during this step is small. When this step is complete, the permanent storage medium contains the new version of the document.

Sometimes, a computer application modifies several related files at once. For example, the user may employ a word processing application to modify an HTML document. An HTML document typically has one main file in which other files are embedded. Thus, an HTML document may comprise many related files.

Suppose a user of a computer application wishes to replace old files on a permanent storage medium with new files in volatile memory that represent a newer version of the old files. This situation can arise when saving an HTML document having many related files. The application could attempt a variation on the "safe save" method wherein the application first saves the new files to the permanent storage medium under temporary names. The application could then change the name of each new file saved on the permanent storage medium under a temporary name to the final name for that file. As already explained, however, there could be many new files. The more there are, the longer this step will take and the greater is the possibility that something will interrupt this step. If a problem does interrupt this step, then the storage medium will likely contain a mixture of old and new files, and there is no way to tell which is which.

Clearly, the traditional "safe save" method does not scale to the problem of replacing one set of files on a permanent storage medium with another set of files in volatile memory. Thus, there is a need in the art for a mechanism for determining if a save attempt has been successful. There is also a need in the art for attempting to complete an interrupted save attempt of multiple files, and, if unable to do so, restoring the original set of files the application intended to replace.

As already explained, an HTML document typically comprises many related files because an HTML document usually has one main file in which other files are embedded. Due to the prevalence of HTML documents, there is a need in the art for a "safe save" method that can be used for saving an HTML document. In other words, there is a need in the art for attempting to complete an interrupted attempt to replace an old HTML document with a new HTML document, and, if unable to do so, restoring the old HTML document for which the replacement was attempted.

SUMMARY OF THE INVENTION

The present invention provides a "safe save" mechanism for completing a file save operation by replacing a set of old files, also described as original files, on a permanent storage medium with a set of new or replacement files in volatile memory. In response to an event leaving the saving application in control but unable to complete the primary steps of the replacement, known as a non-catastrophic failure, a backout can be attempted. A backout is a process for restoring the old set of files to the permanent storage medium. In contrast, a roll forward is a process for completing an interrupted replacement attempt. An event that causes the saving application to lose control or prevents completion of a backout or roll forward is known as a catastrophic failure. In response to a catastrophic failure, a roll forward can be attempted at a later time to finish the replacement of the old files with the new files. The roll forward attempt is accomplished by using a recovery file created during the primary steps of the replacement.

Generally described, the present invention provides a "safe save" method of replacing old files having old names on a permanent storage medium with new files in volatile memory. Some of these files may be opaque files, which are old files which, as a result of a save operation, have become new files without undergoing any changes, other than possibly name changes. A non-opaque file is any file that is not an opaque file, and clearly must be either an old file or a new file, but cannot be both. The non-opaque new files are transferred onto the permanent storage medium and assigned temporary names. An opaque recovery file and a primary recovery file are created. The opaque recovery file lists the old name and a temporary name for each opaque file. The primary recovery file lists the temporary name and a final name for each new file, including the opaque files since opaque files are also new files. After replacing the names of the opaque files with their temporary names, the names of the non-opaque old files are changed from their old names to backup names. Then, the names of the new files, including the opaque files, are changed from their temporary names to their final names. Optionally, the recovery files and the old files can be deleted. The foregoing primary steps of the "safe save" method result in the replacement of the old files with the new files on the permanent storage medium.

If a non-catastrophic failure occurs during the primary steps of the replacement, a backout is attempted to restore the old files to the permanent storage medium. In a backout, each old file is checked to determine if it still has its old name as its filename. If an old file does not have its old name as its filename, the name of that file is changed to its old name. The old files may be processed as described in two batches: the opaque files and the non-opaque old files.

If a catastrophic failure occurs during the primary steps, a backout attempt, or a roll forward attempt, then a roll forward can be attempted at a later time to complete the replacement of old files with new files. In a roll forward, each opaque file is checked to determine if its filename has been changed from the old name to the temporary name specified for the opaque file in the opaque recovery file. If the opaque file's name has not been changed from the old name to the temporary name, then the opaque file's name is changed to the temporary name. Then, each new file is checked to determine if its filename has been changed from the temporary name to the final name specified for the new file in the primary recovery file. If the new file's name has not been changed from the temporary name to the final name, then the new file's name is changed to the final name. According to an aspect of the invention, an attempt is made to detect a catastrophic failure only in response to a user attempting to load the new files into volatile memory from the permanent storage medium.

The various aspects of the present invention may be more clearly understood and appreciated from a review of the following detailed description of the disclosed embodiments and by reference to the appended drawings and claims.

DETAILED DESCRIPTION OF THE EXEMPLARY EMBODIMENTS

When a user modifies one or more old files in a computer application, he usually does so in volatile memory. A user may modify a set of old files not only by changing the contents of individual old files, but also by adding or deleting entire files in order to form a set of new files. After modifying the old files, he usually wants to preserve those changes by replacing the old files on a permanent storage medium with the new files in volatile memory. The present invention includes a "safe save" method for doing this that has additional benefits.

In order to understand the primary steps of the "safe save" method, one must first be familiar with several definitions. An opaque file is an old file that has undergone no modification in becoming a new file, other than possibly undergoing a name change as a result of a save operation. Thus, an opaque file is both an old file and a new file. A non-opaque file is any file that is not an opaque file. Clearly, a non-opaque file is either an old file or a new file, but cannot be both.

The term permanent storage medium is used throughout this application to refer to a recording medium that retains the data recorded on it for long periods of time without power, such as some form of magnetic medium (e.g., floppy disk or tape), hard drive, or optical disk. The term volatile memory refers to memory, such as random access memory (RAM), that loses its data when power is disconnected from the system.

Generally, the present invention provides a "safe save" method of completing a file save operation by replacing old files having old names on a permanent storage medium with new files in volatile memory. The non-opaque new files are transferred onto the permanent storage medium and assigned temporary names. An opaque recovery file and a primary recovery file are then created. The opaque recovery file lists the old name and a temporary name for each opaque file. The primary recovery file lists the temporary name and a final name for each new file, including the opaque files. After replacing the names of the opaque files with their temporary names, the names of the non-opaque old files are changed from their old names to backup names. Then, the names of the new files are changed from their temporary names to their final names. Optionally, the recovery files and the old files can be deleted. The foregoing primary steps of the "safe save" method results in the replacement of the old files with the new files on the permanent storage medium.

Unfortunately, many events can interfere with an attempt to replace old files with new files. For example, the storage medium may run out of space, there could be a permission error, the computer might lose power, a network could go down, or the saving application could crash. These events can be grouped into two categories: catastrophic failures and non-catastrophic failures.

The first category of events that might interfere with a file replacement attempt consists of non-catastrophic failures. A non-catastrophic failure is any event that leaves the program attempting the replacement in control but unable to complete the primary steps of the replacement. Non catastrophic failures include running out of disk space, encountering a permissions error, and encountering a media failure.

If a non-catastrophic failure occurs, the replacement of old files with new files cannot be completed, by definition. If nothing else were done to the files on the permanent storage medium after a non-catastrophic failure, the user would be left with a mixture of old files and new files, and he would have trouble telling what files were old and what files were new. In many cases, a better situation for the user is to have the old files restored to the permanent storage medium.

The present invention provides a method for handling non catastrophic failures during the primary steps of a replacement attempt during a file save operation. A backout is a process for restoring the old files to the permanent storage medium. Though a backout is attempted in response to a non-catastrophic failure, not all backout attempts will be successful. For example, if a non-catastrophic failure is generated by loss of access to the permanent storage medium, perhaps by it becoming unplugged, then the permanent storage medium cannot be accessed to do the backout.

The second category of events that might interfere with a replacement attempt consists of catastrophic failures. A catastrophic failure is defined as either of the following: 1) an event that causes the program attempting the replacement to lose control, or 2) an event that prevents completion of a backout or a roll forward. To clarify the definition of a catastrophic failure, a brief definition of a roll forward is given now, though the term will be explained in greater detail later. A roll forward is a process for completing a replacement attempt that has been interrupted by a catastrophic failure, and the roll forward is accomplished using the recovery files created during the primary steps of the replacement. A catastrophic failure of the first type can occur if there is a power outage, the program attempting the replacement crashes, or the network goes down. An example of the second type of catastrophic failure is where a non-catastrophic failure is caused by loss of access to the permanent storage medium, thereby also preventing a successful backout.

The present invention also provides a method for handling catastrophic failures during an attempt to replace old files with new files. If a catastrophic failure occurs during a replacement attempt and is later detected, a roll forward is attempted to complete the replacement of old files with new files. As a catastrophic failure of the second type includes events that prevent completion of a roll forward, it should be understood that a failed roll forward attempt leads to another roll forward attempt, though preferably at a later time. In a roll forward attempt, the opaque recovery file is used to determine if any of the opaque files still have their old names. If they do, the names of those opaque files are changed to the temporary names specified for them in the opaque recovery file. Then, the primary recovery file is used to determine if any of the new files still have their temporary names. If they do, the names of those new files are changed to the final names specified for them in the primary recovery file.

The detailed description will elaborate on aspects of the present invention. First, an exemplary operating environment for this invention is described. Then, details of embodiments of the present invention in a HyperText Markup Language (HTML) environment are given. Referring now to the drawings, in which like numerals reference like elements throughout the several figures, aspects of the present invention and the exemplary operating environment will be described.

Exemplary Operating Environment

Figure 1:
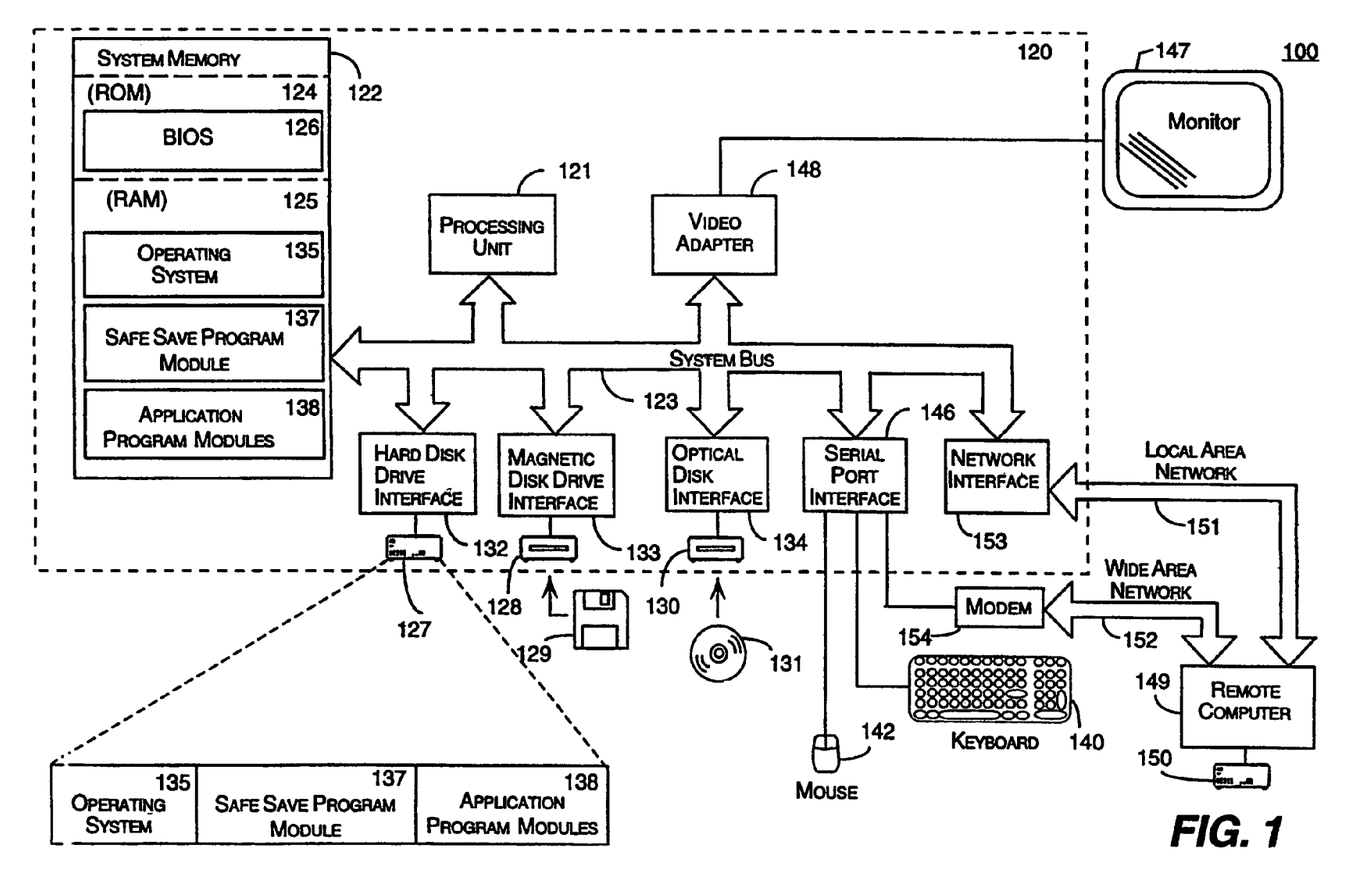
FIG. 1 is a block diagram illustrating the operating environment for an exemplary embodiment of the present invention.

FIG. 1 and the following discussion are intended to provide a brief and general description of a suitable computing environment 100 for an implementation of the present invention. The exemplary operating environment 100 includes a conventional personal computer system 120, including a processing unit 121, a system memory 122, and a system bus 123 that couples the system memory 122 to the processing unit 121. The system memory 122 includes read only memory (ROM) 124 and RAM 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable magnetic disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A user may enter commands and information into the personal computer 120 through conventional input devices, including a keyboard 140 and pointing device, such as a mouse 142. The computer system 120 may include additional input devices (not shown), such as a microphone, joystick, game pad, satellite dish, scanner, or the like. These and other input devices are often connected to the processing unit 121 through a serial port interface 146 that is coupled to the system bus, but may be connected by other interfaces, such as a game port or a universal serial bus (USB). A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over a WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

A number of program modules may be stored in the drives and RAM 125 of the computer system 120. Program modules control how the computer system 120 functions and interacts with the user, with 110 devices or with other computers. Program modules include routines, operating system 135, application programs modules 138, data structures, browsers, and other software or firmware components. An exemplary embodiment of the present invention comprises one or more "Safe Save" program modules 137 stored in RAM 125 of the computer 100. Alternatively, the program modules 137 may be implemented as part of the application programs modules 138 or the operating system 135.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Replacing Old Files with New Files in an HTML Environment

One example of a related group of files for which the present invention is applicable is an HTML document. An HTML document typically has one main file in which other files are embedded. Thus, an HTML document may comprise many related files.

In order to modify an HTML document, a user may employ a word processing application running on a computer, such as the computer system 120. To do so, he typically loads an HTML document into volatile memory from a permanent storage medium. He then makes changes to the document in volatile memory, possibly deleting some embedded files and adding different ones. A suitable word processing application for modifying HTML documents is Microsoft's "WORD" program, which is produced and distributed by Microsoft Corporation of Redmond, Wash.

In an exemplary embodiment, the word processing application itself implements a "safe save" method when the user indicates that he wishes to save a modified document, perhaps by choosing the Save command from a menu. The user is indicating through this command that he wishes to replace the old HTML document on the permanent storage medium with the new HTML document in volatile memory.

Figure 2:
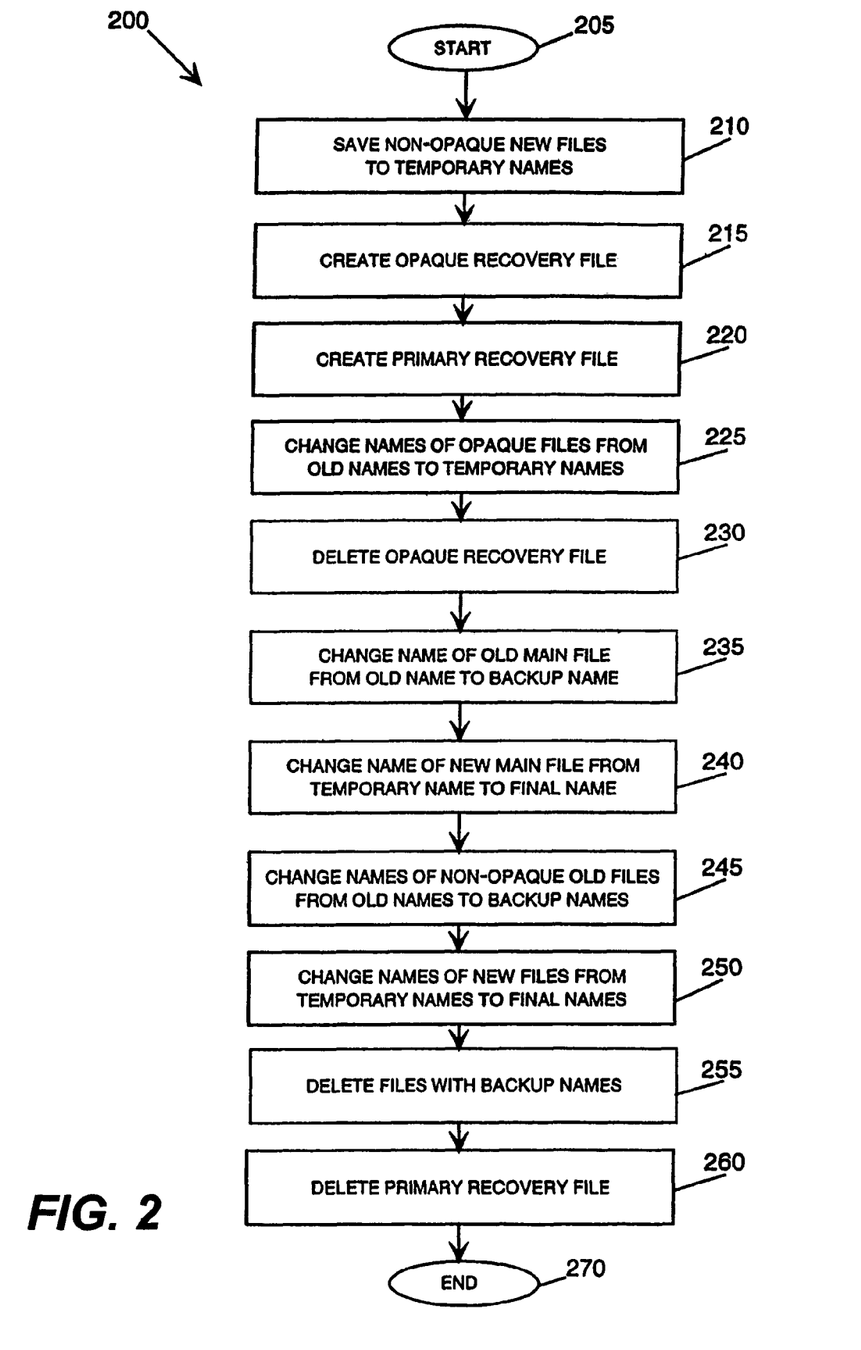
FIG. 2 is a flow chart illustrating the primary steps of an exemplary safe save method.

FIG. 2 is a flow chart illustrating the primary steps of an exemplary "safe save" method 200. The primary steps are performed only in response to the user saving a modified document. If the user is saving an entirely new document, the files comprising that document are saved on the permanent storage medium, and no special handling is required.

At the "START" step 205, an old HTML document is maintained on a permanent storage medium. The old HTML document comprises one or more old files, alternatively described as original files. One of the old files is an old main file, or the primary original file, in which the remaining old files are embedded. Each of the old files has an old or original name, which is the filename under which those files were previously saved.

In volatile memory is a new HTML document that is a modified version of the old HTML document. The new HTML document comprises one or more new files, alternatively described as replacement files. One of the new files is a new main file, or the primary replacement file, in which the remaining new files are embedded. Each of the new files has a final name, which is the name chosen by either the user or the saving application to be the filename of the new file once the old HTML document is replaced by the new HTML document.

Some of the old files are opaque files, which are old files that have undergone no modification in becoming new files, other than possibly undergoing a name change, as a result of a save operation. Neither the old main file nor the new main file is treated as an opaque file, even if they are identical.

Figure 3A:
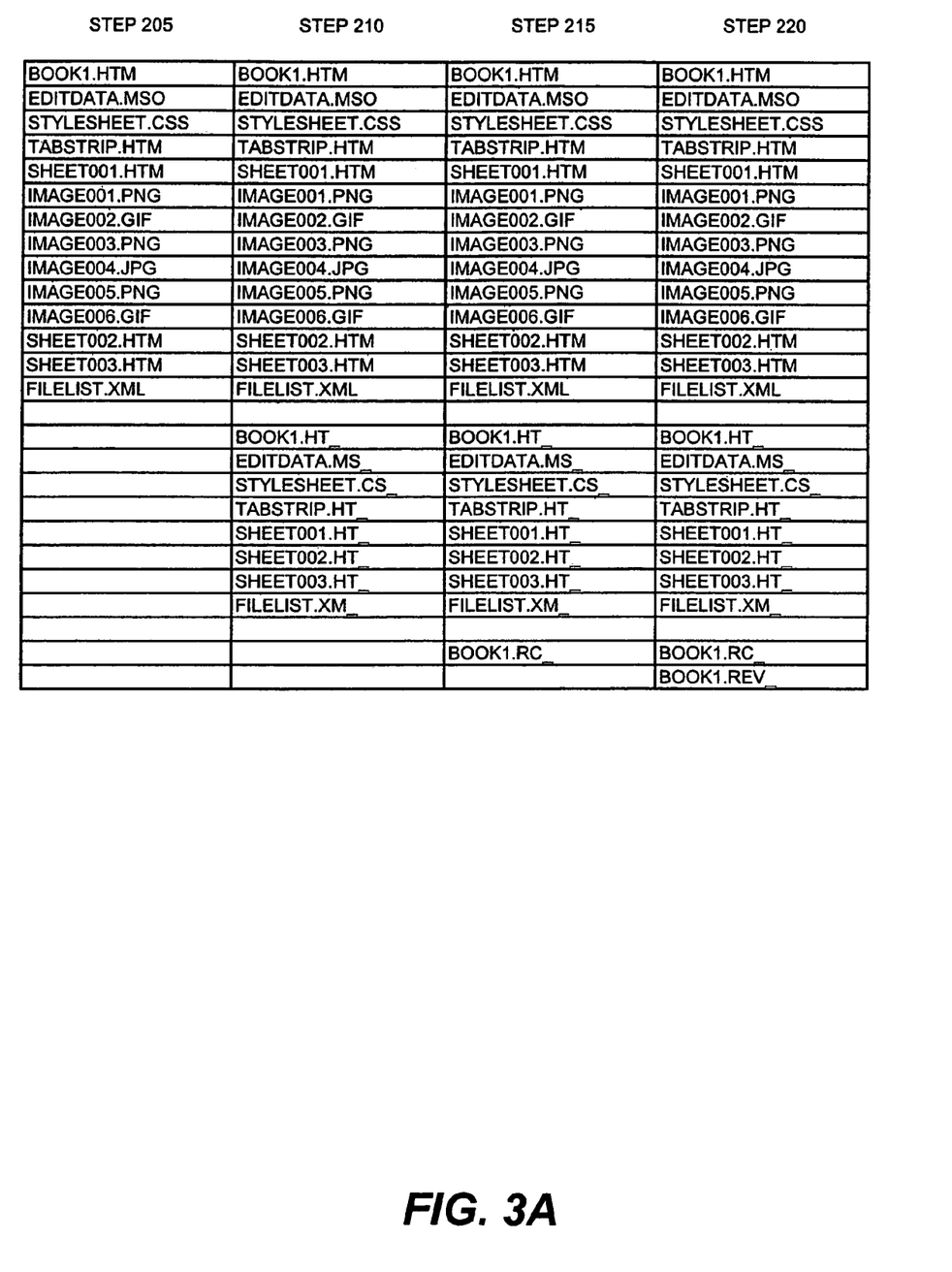
FIG. 3A is a chart illustrating a representative example of changes occurring within the contents of a hypothetical permanent storage medium in response to performing each of the primary steps of the exemplary safe save method shown in FIG. 2.
Figure 3B:
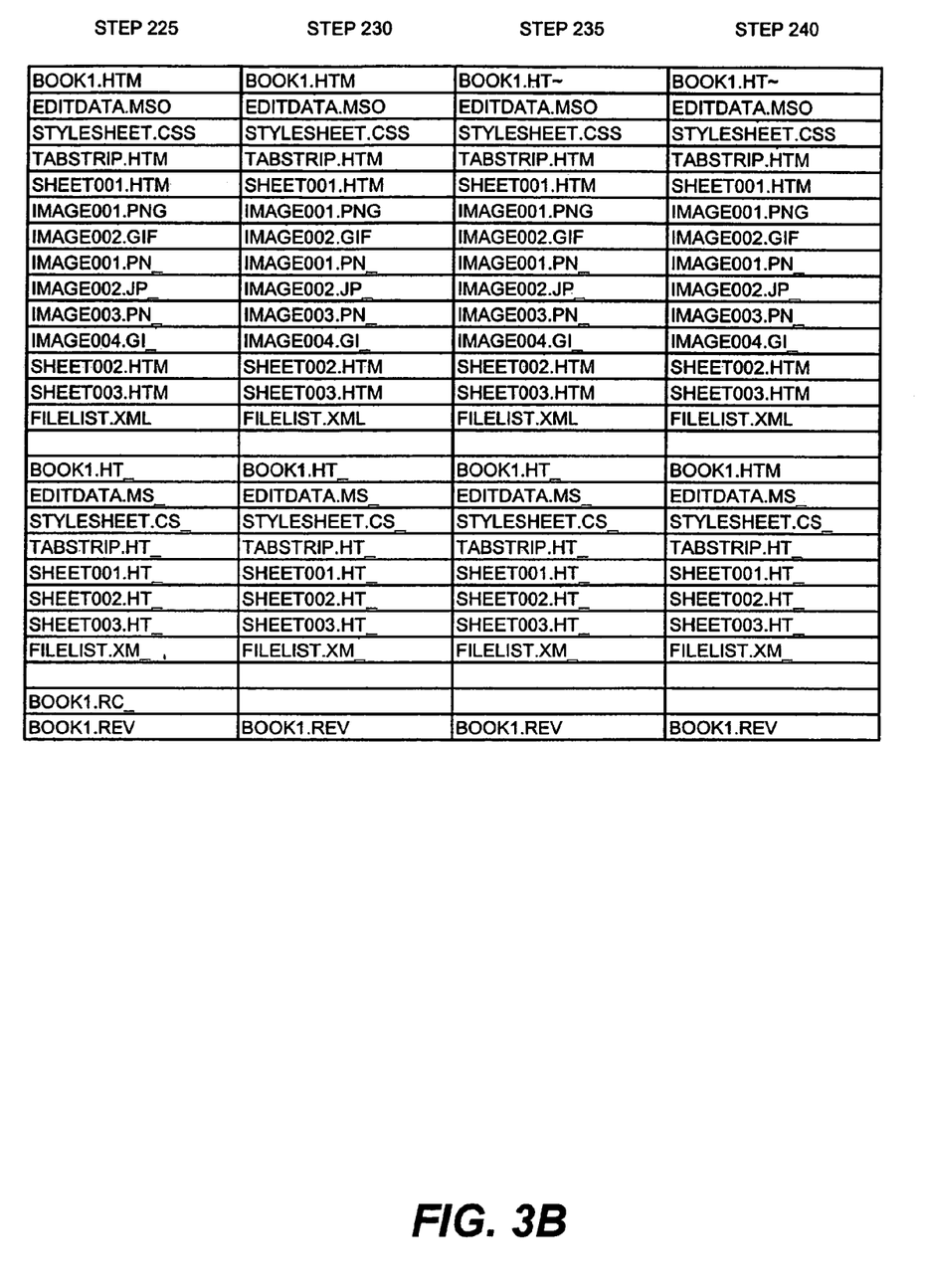
FIG. 3B is a continuation of the chart shown in FIG. 3A.
Figure 3C:
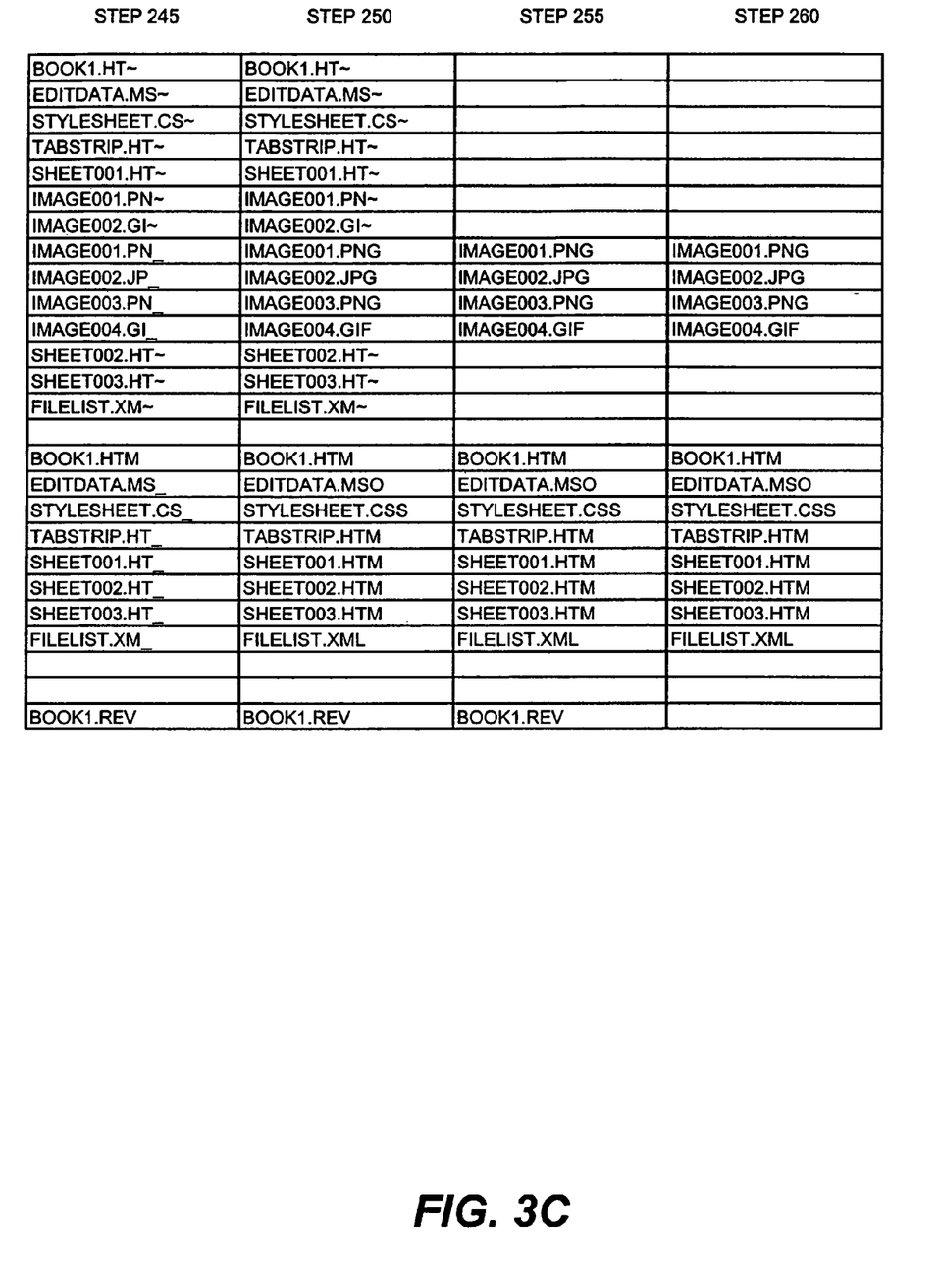
FIG. 3C is a continuation of the chart shown in FIGS. 3A and 3B.

FIGS. 3A-3C are a chart which shows an example illustrating the contents of a hypothetical permanent storage medium after each of the primary steps 200 of FIG. 2. Each column is labeled with one of the FIG. 2 steps. A column shows the file names of any files located on the permanent storage medium after the step labeling that column is performed. Each row of the chart corresponds to one file and shows the name changes that file undergoes as the primary steps 200 of FIG. 2 are performed. For example, the column labeled "Step 205" shows the old files and the file names under which they are stored on the permanent storage medium. Book1.htm is the old main file. Image003.png, image004.jpg, image005.png, and image006.gif are opaque files.

In step 210, the non-opaque new files are transferred onto the permanent storage medium. At that time, the non-opaque new files are also assigned temporary names. The temporary name of each new file is preferably created by replacing the last character of the final name of the new file with the "-" character. In FIG. 3A, the column labeled "Step 210" shows the results of this step for the example.

After assigning temporary names to the new files, step 215 is executed. In step 215, an opaque recovery file is created. The opaque recovery file typically lists the old name and a temporary name for each old file. Again, the temporary name of each opaque file is preferably created the same way the temporary name of each of the other new files is created, which is by replacing the last character of the final name of the opaque file with the "-" character. The general format of a recovery file will be described below with respect to Table 1.

A recovery file can comprise multiple records, appended one after another, each of which specifies an operation to perform on a file, a "source filename" for that file, and a "destination filename" for that file. A 0 can specify a copy operation, a 1 can specify a rename operation, and a 2 can specify a delete operation. If a rename operation is specified in a record, then the record indicates that the name of the file whose name is "source filename" is to be changed to "destination filename." Preferably, only the rename operation is used for records of the opaque and primary recovery files. A representative format of a record in an exemplary recovery file is shown in Table 1 and an example of a recovery file record is shown in Table 2.

TABLE 1

Exemplary Recovery File

| Byte Offset | Contents |
| --- | --- |
| 0 | Operation to perform |
| 1, . . . , 4 | Length of source filename |
| 5, . . . , N | Source filename |
| N + 1, . . . , N + 4 | Length of destination filename |
| N + 5, . . . , N + M | Destination filename |

TABLE 2

Recovery File Record (1)(15)"c:\Image003.png"(15)"c:\Image001.pn_"

A recovery file also preferably has a begin file marker (also called a TOF marker, for Top Of File) and an end file marker (also called an EOF marker, for End Of File). The TOF and EOF markers designate the start and end points of the recovery file. They are also used to verify that the file is intact.

In Table 1, the Byte Offset indicates how many bytes from the beginning of the record one must move to find the information located in the adjacent Contents column. Thus, the first byte of information (0 byte offset) specifies the operation to perform on the file to which that record pertains. The next four bytes of the record are used to represent a number, which is the length in bytes of the source filename. Each character can be represented with one byte. The range of the fifth byte offset to the Nth byte offset defines the source filename. The next four bytes of the record are used to represent a number, which is the length in bytes of the destination filename. The range of the N+5 byte offset to the N+M byte offset defines the destination filename.

For the example of a recovery file record in Table 2, the parentheses indicate numbers, and the quotes indicate character strings. This record specifies a source filename "c:\Image003.png" which is fifteen characters long. The record also specifies a destination filename "c:\Image001.pn_" which is fifteen characters long. As a rename operation is specified, the recovery file record indicates that the file whose name is currently "c:\Image003.png" is going to experience or has experienced a name change to "c:\Image001.pn_".

Returning to step 215, an opaque recovery file is created. The opaque recovery file preferably has the format for a recovery file shown in Table 1. The opaque recovery file can include one record for each opaque file. The source filename of an opaque file's record is the old name of the opaque file, and the destination filename of an opaque file's record is a temporary name for that opaque file. The temporary name can be created as already explained. Thus, the opaque recovery file lists the old name and a temporary name for each old file. The opaque recovery file can be stored on the permanent storage medium and assigned a name formed by taking the file name of the old main file and changing the extension to ".rc_".

In the example of FIGS. 3A-3C, Book1.rc_ is the opaque recovery file. Table 3 shows the information contained in the records of Book1.rc_ for the example of FIGS. 3A-3C.

TABLE 3

Rename image003.png → image001.pn_
Rename image004.jpg → image002.jp_
Rename image005.png → image003.pn_
Rename image006.gif → image004.gi_

In step 220, a primary recovery file is created. The primary recovery file can list the temporary name and the final name for each new file, including the opaque files. The primary recovery file's format is preferably the same as the general format described above with respect to Table 1, which also defines the general format for the opaque recovery file. The primary recovery file typically has one record for each new file. The source filename of a new file's record is the temporary name of the new file. The destination filename of the new file's record is the final name determined by the user or the program to be the filename of the new file once the replacement of the old HTML document by the new HTML document is complete on the permanent storage medium. The primary recovery file can be stored on the permanent storage medium and assigned a name formed by taking the filename of the old main file and changing the extension to ".rcv".

In the example of FIGS. 3A-C, Book1.rcv is the primary recovery file. Table 4 shows the information contained in the records of Book1.rcv for the example of FIGS. 3A-3C.

TABLE 4

Rename Book1.ht_ → Book1.htm
Rename editdata.ms_ → edidata.mso
Rename stylesheet.cs_ → stylesheet.css
Rename tabstrip.ht_ → tabstrip.htm
Rename sheet001.ht_ → sheet001.htm
Rename image001.pn_ → image001.png
Rename image002.jp_ → image002.jpg
Rename image003.pn_ → image003.png
Rename image004.gi_ → image004.gif
Rename sheet002.ht_ → sheet002.htm
Rename sheet003.ht_ → sheet003.htm
Rename filelist.xm_ → filelist.xml After creating the primary recovery file, step 225 is performed. In step 225, the names of the opaque files are changed from their old names to their temporary names. Table 5 lists the name changes that are performed by this step in the example of FIGS. 3A-3C.

TABLE 5

Rename image003.png → image001.pn_
Rename image004.jpg → image002.jp_
Rename image005.png → image003.pn_
Rename image006.gif → image004.gi_

After the names of the opaque files are changed from their old names to their temporary names, the opaque recovery file is deleted in step 230.

In step 235, the name of the old main file is changed from its old name to a backup name. The backup name for any old file, including the old main file, is preferably created by replacing the last character of the old file's name with the "~" character. In step 240, the name of the new main file is changed from its temporary name to its final name.

In step 245, the names of the non-opaque old files are changed from their old names to their backup names. Even though the old main file may be a non-opaque old file, the old main file is excluded from this step because the name of the old main file was already changed from its old name to its backup name in step 235. This step can be performed by attempting to change the names of all the old files, including the opaque files, from their old names to their backup names. However, the opaque files will not be found under their old names at this step because the opaque files already had their names changed in step 225 from their old names to their temporary names. Hence, a "file not found" error may be generated, which can be ignored so that the name change is not done for the opaque files in this step. Table 6 lists the name changes that are attempted in this step for the example of FIGS. 3A-3C.

TABLE 6

Rename editdata.mso__ → edidata.ms~
Rename stylesheet.css__ → stylesheet.cs~
Rename tabstrip.htm → tabstrip.ht~
Rename sheet001.htm → sheet001.ht~
Rename image001.png → image001.pn~
Rename image002.gif → image002.gi~
Rename image003.png → image003.pn~
Rename image004.jpg → image004.jp~
Rename image005.png → image005.pn~
Rename image006.gif → image006.gi~
Rename sheet002.htm → sheet002.ht~
Rename sheet003.htm → sheet003.ht~
Rename filelist.xml → filelist.xm~

In step 250, the names of the new files are changed from their temporary names to their final names. Although the new main file is a new file, it is excluded from this step because the new main file already had its name changed from its temporary name to its final name in step 240. Table 7 lists the name changes that are performed by this step for the example of FIGS. 3A-3C.

TABLE 7

Rename editdata.ms__ → edidata.mso
Rename stylesheet.cs__ → stylesheet.css
Rename tabstrip.ht__ → tabstrip.htm
Rename sheet001.ht__ → sheet001.htm
Rename image001.pn__ → image001.png
Rename image002.jp__ → image002.jpg
Rename image003.pn__ → image003.png
Rename image004.gi__ → image004.gif
Rename sheet002.ht__ → sheet002.htm
Rename sheet003.ht__ → sheet003.htm
Rename filelist.xm__ → filelist.xml In step 255, the backup files are deleted from the permanent storage medium. The backup files are all those with backup names on the permanent storage medium. These are the non-opaque old files. Table 8 lists the files that are deleted by this step for the example of FIGS. 3A-3C.

TABLE 8

Delete Book1.ht~
Delete editdata.ms~
Delete stylesheet.cs~
Delete tabstrip.ht~
Delete sheet001.ht~
Delete image001.pn~
Delete image002.gi~
Delete image003.pn~
Delete image004.jp~
Delete image005.pn~
Delete image006.gi~
Delete sheet002.ht~
Delete sheet003.ht~
Delete filelist.xm~

In step 260, the primary recovery file is deleted. Then the primary step 200 terminates at the "END" step 270.

If the method 200 is performed without a catastrophic or non-catastrophic failure occurring, the old files will have been successfully replaced on the permanent storage medium with the new files. If, however, catastrophic or non-catastrophic failure occurs during this "safe save" method, then alternative procedures can be completed in effort to recover from the catastrophic or non-catastrophic failure. These procedures, explained in FIGS. 4-6 and the accompanying text, will be discussed shortly.

Figure 6:
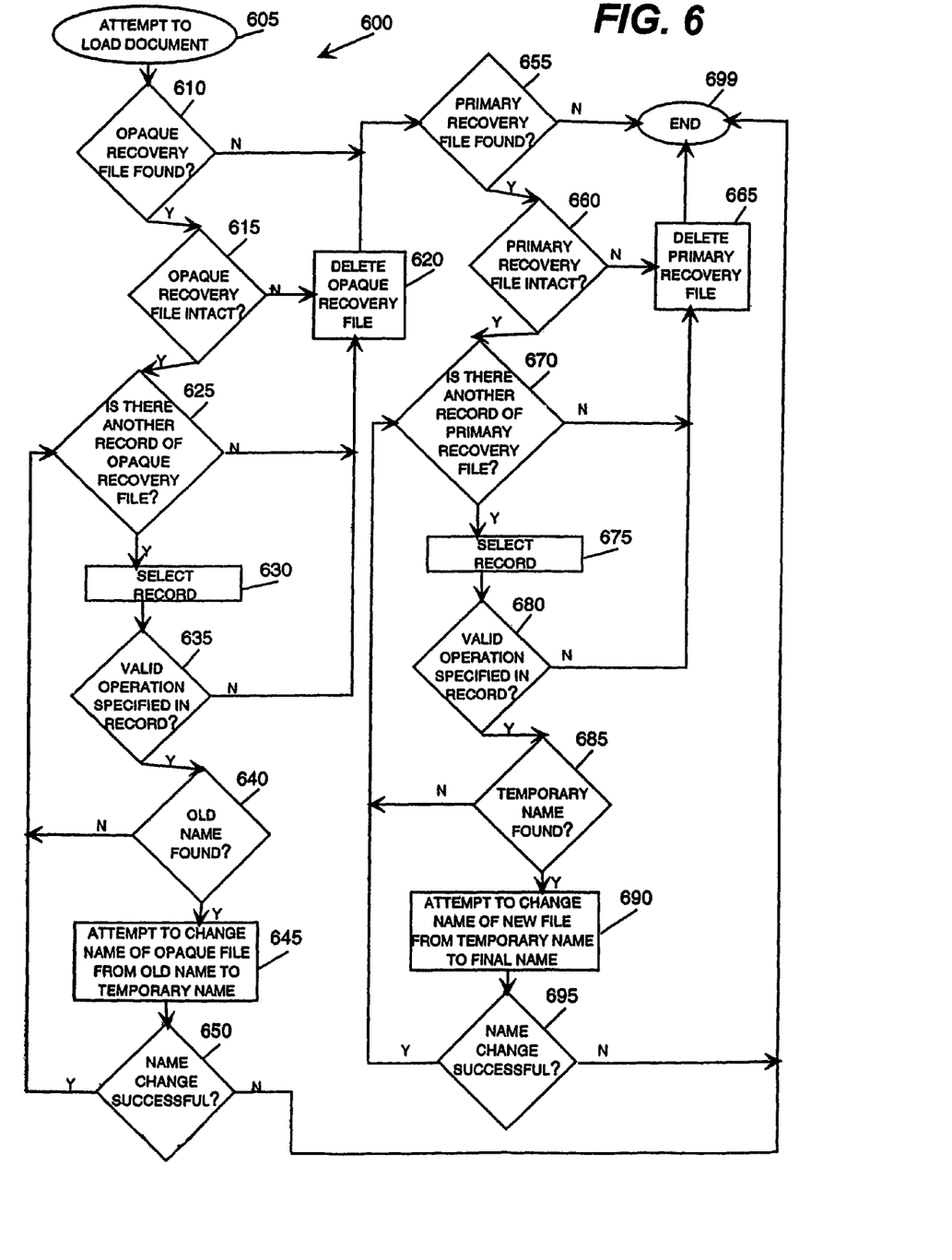
FIG. 6 is a flow chart illustrating the steps of an exemplary roll forward process.

Though the importance of steps 235 and 240 will be greater appreciated after a review of the description of FIG. 6, a brief explanation is given now. FIG. 6 is a flow chart of an exemplary roll forward process 600 that is performed after a catastrophic failure during the exemplary primary steps 200 of the "safe save" method. In one embodiment of the present invention, a roll forward process 600 is initiated when the user attempts to access a new HTML document This access is typically attempted by trying to load the new HTML document into volatile memory from the permanent storage medium at some point after an unsuccessful attempt to replace the old HTML document with the new HTML document on the permanent storage medium. To attempt to load the new HTML document into volatile memory, however the user has to locate the new main file if it exists on the permanent storage medium under the filename the user expects it to have—i.e., its final name In order to initiate the roll forward process 600 in one embodiment of the invention, therefore, a copy of the new main file must be on the permanent storage medium with its final name as the filename. Steps 235 and 240, shown in FIG. 2, represent quick operations, so there will always be a copy of the new main file to initiate the roll forward process 600 should a catastrophic failure occur during the subsequent step 245 of changing the names of the remaining non-opaque old files from their old names to their backup names. In this manner, a copy of the new main file is also available to initiate the roll forward process 600 should a catastrophic failure occur when changing the names of the remaining new files to their final steps 250.

If steps 235 and 240 were not performed, there might not be a copy of the new file on the permanent storage medium allowing the user to initiate the roll forward process 600. An example illustrating this will now be presented assume that, instead of performing steps 235 and 240, the names of all of the non-opaque old files (including the main file) are changed to their backup names in step 245. Assume further that in the subsequent step 250, the names of tall the new files (including the new main file) are changed to their final names. If a catastrophic failure occurs during step 245 after the name of the old main file has been changed to the backup name, then no copy of the new main file is available on the permanent storage medium to allow the user to initiate the roll forward process 600.

Figure 4:
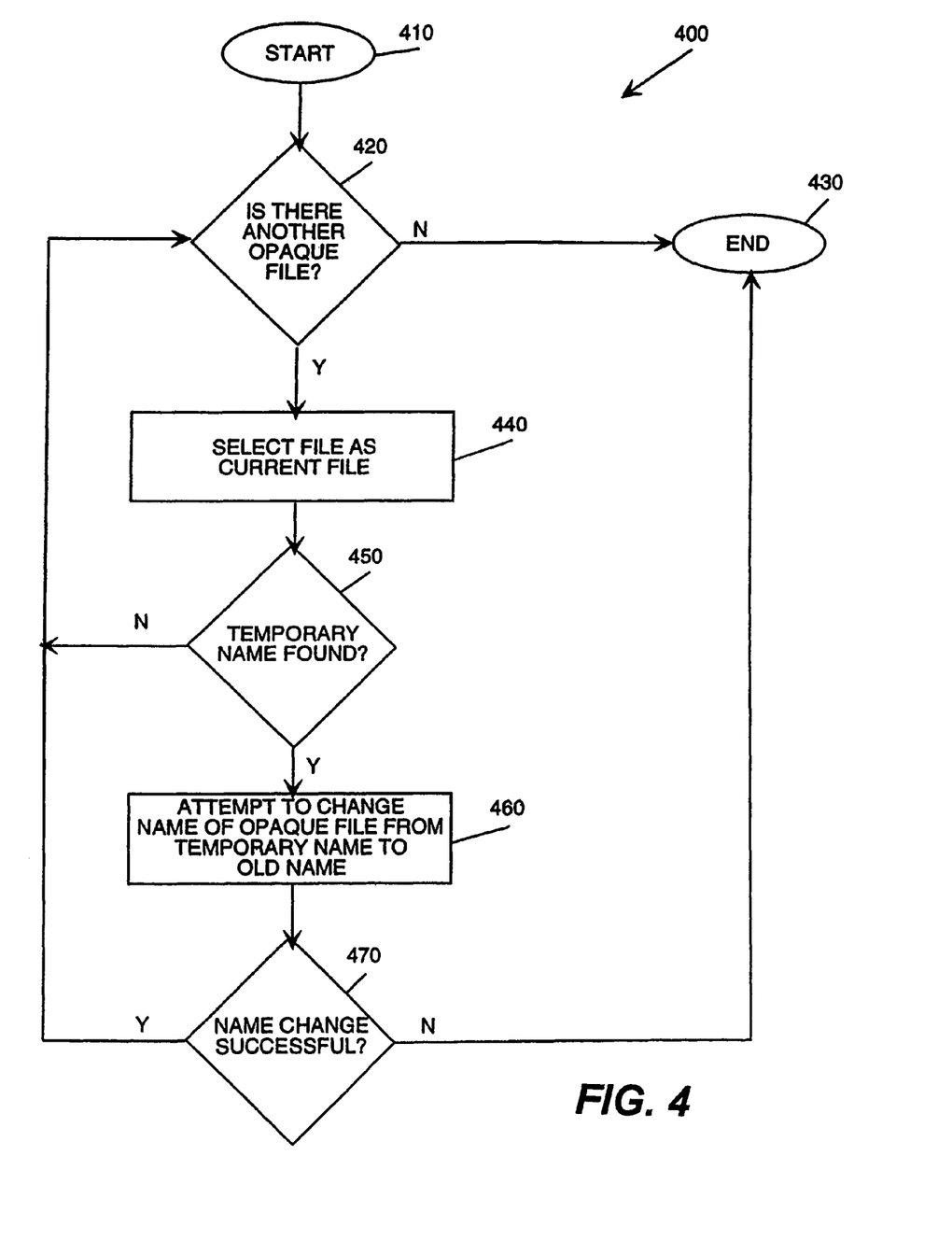
FIG. 4 is a flow chart illustrating the steps of an exemplary opaque backout process.

FIG. 4 is a flow chart of the steps for an exemplary opaque backout process 400. It is performed in response to a non-catastrophic error that occurs through step 235 of the exemplary "safe save" method 200 illustrated in FIG. 2. The purpose of the opaque backout process 400 is to restore the old files to their old names on the permanent storage medium since the replacement cannot be completed due to the non-catastrophic error. As the only old files whose names are changed through step 235 are the opaque files, the opaque backout process 400 proceeds by insuring that all the opaque files are restored to their old names.

The opaque backout process 400 starts at step 410 and proceeds to step 420. Step 420 effectively begins a loop for processing each of the opaque files. In step 420, an inquiry is conducted to determine if there is another opaque file to process. If there is not, then the opaque backout process 400 ends at step 430.

If there is another opaque file to process, then that opaque file is selected as the current file in step 440. In step 450, an inquiry is conducted to determine whether the temporary name associated with the current file can be found on the permanent storage medium. If the temporary name is not found, then the opaque file that is the current file has never had its name changed from its old name to its temporary name, and control passes back to step 420 to determine if there is another opaque file to process. If the temporary name is found, however, then step 460 is performed. In step 460, an attempt is made to change the name of the opaque file which is the current file from its temporary name back to its old name.

In step 470, an inquiry is conducted to determine whether this name change was successful. If the name change was not successful, then a catastrophic failure has occurred and the process ends at step 430. When the user attempts to open the document at a later time, only a roll forward can be attempted. An exemplary roll forward process 600 is illustrated in FIG. 6 and shall be discussed. On the other hand, if a determination is made in step 470 that the name change was successful, then control passes back to step 420 to determine if there is another opaque file to process.

Figure 5:
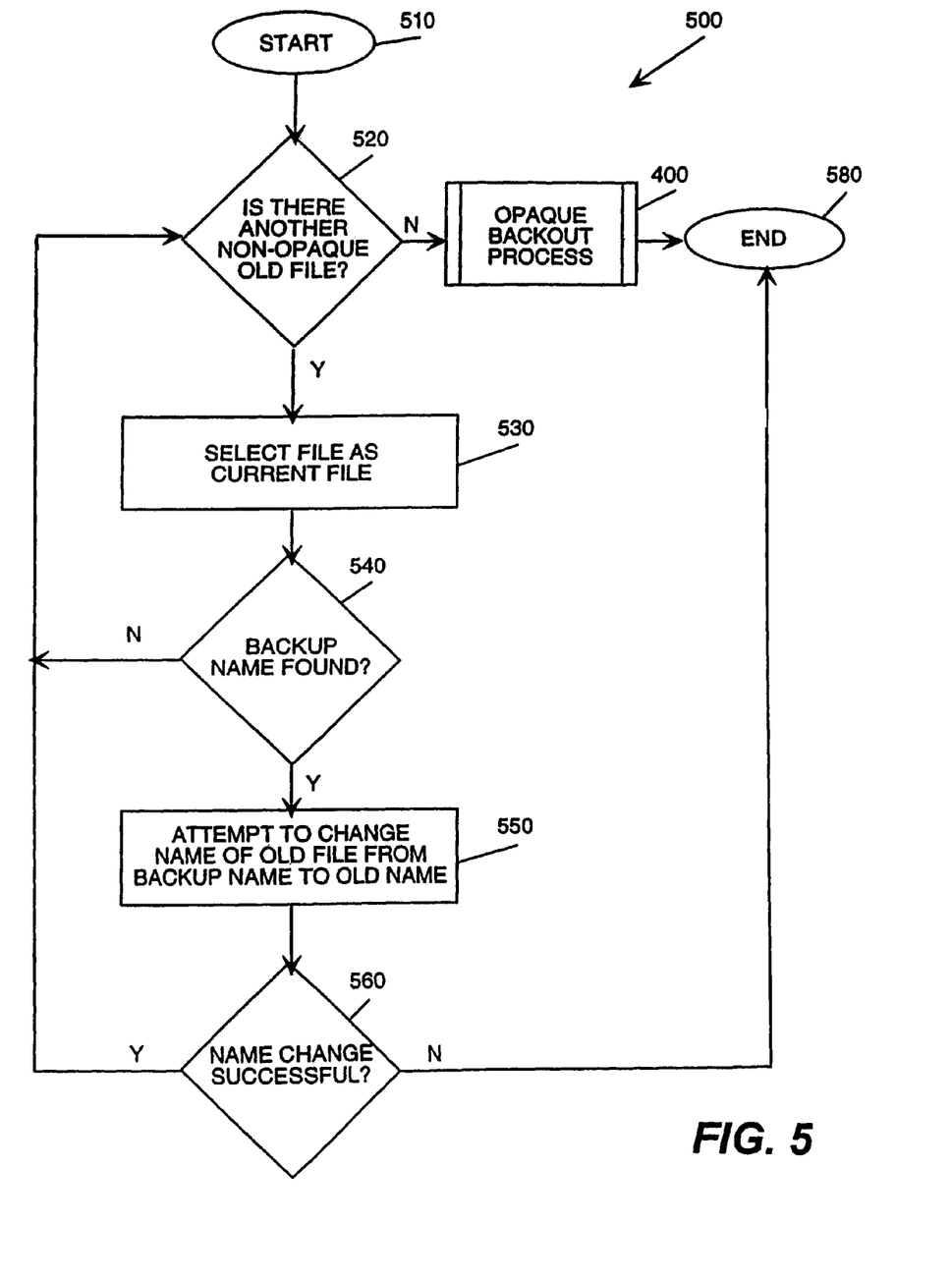
FIG. 5 is a flow chart illustrating the steps of an exemplary full backout process.

FIG. 5 is a flow chart of the steps for an exemplary full backout process 500. It is performed in response to a non-catastrophic error occurring during steps 240, 245, or 250 of the primary steps 200 of the exemplary "safe save" method illustrated in FIG. 2. The purpose of the full backout process 500 is to restore the old files to their old names on the permanent storage medium. If a non-catastrophic error occurs during steps 240, 245 or 250, then both opaque and non-opaque old files have undergone name changes. Hence, the full backout process 500 proceeds by first restoring all the non-opaque old files to their old names on the permanent storage medium, and then restoring all the opaque files to their old names.

The full backout process 500 starts at step 510 and proceeds to step 520. Step 520 effectively begins a loop for processing all of the non-opaque old files. In step 520, an inquiry is conducted to determine if there is another non-opaque old file to process. If there is another non-opaque old file to process, then that non-opaque old file is selected as the current file in step 530.

In step 540, an inquiry is conducted to determine whether the backup name associated with the current file can be found on the permanent storage medium. If the backup name associated with the current file is not found, then the non-opaque old file has not yet had its name changed from its old name to its backup name, and control passes back to step 520 to determine if there is another non-opaque old file to process. If, on the other hand, the backup name associated with the current file is found on the permanent storage medium, then an attempt is made to change the name of the non-opaque old file that is the current file from its backup name to its old name in step 550.

In step 560, an inquiry is made to determine whether the name change was successful. If the name change was not successful, then a catastrophic failure has occurred and the process ends at step 580. When the user attempts to open the document at a later time, only a roll forward can be attempted. An exemplary roll forward process 600 is illustrated in FIG. 6 and will be discussed. If, on the other hand, a determination is made in step 560 that the name change was successful, then control returns to step 520 to determine if there is another non-opaque old file to process.

In step 520, if there is not another non-opaque old file to process, then all the non-opaque old files have been restored to their old names on the permanent storage medium. At that point, only the opaque files need to be restored to their old names on the permanent storage medium. So, the opaque backout process 400 is then performed before the process ends at step 580.

FIG. 6 is a flow chart of the steps for an exemplary roll forward process 600 for handling a catastrophic failure during any of the processes of the exemplary "safe save" method illustrated in FIG. 2, 4, or 5. In one embodiment in the present invention, the roll forward process 600 is initiated in step 605 when the user attempts to access an HTML document by loading it into volatile memory from the permanent storage medium.

The HTML document the user is attempting to load into volatile memory in step 605 may represent the new HTML document based on an unsuccessful attempt to replace an old HTML with a new HTML document. In this case, a catastrophic failure has disrupted the attempt to replace the old HTML document. Alternatively, there may be no problem loading the HTML document into volatile memory because there was no catastrophic failure. Thus, a determination must be made concerning whether there has been a catastrophic failure that warrants further action before loading the requested document into volatile memory.

In one embodiment of the present invention, this determination is made based upon whether the opaque and primary recovery files are available to support file recovery operations. If the opaque recovery file is available, then a catastrophic failure occurred before the names of all the opaque files were changed from their old names to their temporary names since the opaque recovery file is deleted after that step is completed. Thus, if the opaque recovery file is found, the roll forward process 600 insures that the names of all the opaque files are changed to their temporary names. If the primary recovery file is found, then there was a catastrophic failure before the names of all the new files were changed from their temporary names to their final names. Thus, if the primary recovery file is found, the roll forward process 600 insures that the names of all the new files have been changed to their final names.

After the user attempts to load an HTML document into volatile memory in step 605, an inquiry is conducted in step 610 to determine whether an opaque recovery file can be found in a predetermined location, which is the permanent storage medium in one embodiment of the present invention. If the opaque recovery file is not found, control proceeds to step 655 to attempt to determine if there is a primary recovery file to process. If the opaque recovery file is found, then step 615 is performed.

In step 615, an inquiry is conducted to determine whether the opaque recovery file is intact. The opaque recovery file is considered intact if it has valid TOF and EOF markers. If the opaque recovery file is not intact, the opaque recovery file is deleted in step 620, before proceeding to step 655 to determine whether there is a primary recovery file to be processed. If the opaque recovery file is intact, then step 625 is performed.

Step 625 effectively begins a loop to process all the records of the opaque recovery file. An inquiry is conducted to determine whether there is another record of the opaque recovery file to process. If there is not another record, then the loop is complete. The opaque recovery file is deleted in step 620 before proceeding to step 655 to determine whether there is a primary recovery file to process. If there is another record of the opaque recovery file to process in step 625, then that record is selected in step 630.

In step 635, an inquiry is conducted to determine whether a valid operation is specified in the operation byte of the selected record. An operation is considered valid if the operation byte is set to a 0, 1, or 2. If a valid operation is not specified, then it is assumed that the opaque recovery file is not intact. This file is deleted in step 620 before proceeding to step 655 to determine whether there is a primary recovery file to process. If a valid operation is specified in step 635, then step 640 is executed.

In step 640, an inquiry is conducted to determine whether a file having as its filename the old name specified in the selected record is located on the permanent storage medium. If a file having the old name as its filename is not located on the permanent storage medium, then control passes back to step 625 to determine if there is another record of the opaque recovery file to process. If a file having the old name as its filename is located on the permanent storage medium, then the opaque file to which the selected record refers has not yet had its name changed from its old name to its temporary name. In that case, an attempt is made to change the name of the opaque file from its old name to its temporary name in step 645.

In step 650, an inquiry is conducted to determine whether the name change was successfully performed. If the name change was not successfully performed, then this is a catastrophic failure and the process ends at step 699. In this case, the roll forward process 600 will be attempted once again if the user attempts to load the new HTML document into volatile memory at a later time. If the name change was successfully performed, then control passes back to step 625 to determine whether there is another record of the opaque recovery file to process.

In step 655, an inquiry is conducted to determine whether there is a primary recovery file to process. This decision is made by looking for the primary recovery file in a predetermined location, which is the permanent storage medium in one embodiment of the present invention. If the primary recovery file is not found, the process ends at step 699. If the primary recovery file is found, then step 660 is executed.

In step 660, an inquiry is made to determine whether the primary recovery file is intact. The primary recovery file is considered intact if it has valid TOF and EOF markers. If the primary recovery file is not intact, then the primary recovery file is deleted in step 665 before the process ends at step 699. If the primary recovery file is intact in step 660, then step 670 is performed.

Step 670 effectively begins a loop to process all the records of the primary recovery file. An inquiry is conducted to determine whether there is another record of the primary recovery file to process. If there is not another record, then the loop is complete, and the primary recovery file is deleted in step 665 before the process ends at step 699. If there is another record of the primary recovery file to process in step 670, then that record is selected in step 675.

In step 680, an inquiry is conducted to determine whether a valid operation is specified in the operation byte of the selected record. An operation is considered to be valid if the operation byte is set to 0, 1 or 2. If a valid operation is not specified, then it is assumed that the primary recovery file is not intact. This file is deleted in step 665 before the process ends at step 699. If a valid operation is specified in the selected record in step 680, then step 685 is executed.

In step 685, an inquiry is conducted to determine whether a file having as its filename the temporary name specified in the selected record is located on the permanent storage medium. If a file having the temporary name as its filename is not located on the permanent storage medium, then control passes back to step 670 to determine whether there is another record of the primary recovery file to process. If a file having the temporary name as its filename is located on the permanent storage medium, then the new file has not yet had its name changed from its temporary name to its final name. In that case, an attempt is made to change the name of the new file from its temporary name to its final name in step 690.

In step 695, an inquiry is made to determine whether this name change was successfully performed. If the name change was not successfully performed, then a catastrophic failure has occurred and the process ends at step 699. In that case, the roll forward process 600 will be attempted again if the user attempts to load the new HTML document into volatile memory at a later time. If the name change was successfully performed, however, control passes back to step 670 to determine whether there is another record of the primary recovery file to process.

The invention may conveniently be implemented in one or more program modules, such as the Safe Save Program Module 137, that are based upon the methods described in the detailed description. No particular programming language has been described for carrying out the various procedures described above because it is considered that the operations, steps, and procedures described above and illustrated in the accompanying drawings are sufficiently disclosed to permit one of ordinary skill in the art to practice an exemplary embodiment. Moreover, there are many computers and operating systems which may be used in practicing an exemplary embodiment and therefore no detailed computer program could be provided which would be applicable to all of these many different systems. Each user of a particular computer will be aware of the language and tools which are most useful for that user's needs and purposes.

One skilled in the art should recognize that it is possible to implement the present invention without distinguishing between opaque and non-opaque files. In the primary steps of the "safe save" method, this would require saving a copy of all new files in volatile memory to the permanent storage medium instead of doing this only for the non-opaque new files. That way, there is no need to create an opaque recovery file, nor is there a need to change to change the names of the opaque files from their old names to their temporary names. Then, the names of all the old files are changed from their old names to their backup names. Finally, the names of the new files are changed from their temporary names to their final names. The backout and roll forward processes would be modified accordingly.

One skilled in the art should also recognize that the recovery files can be implemented in different ways. One recovery file can list all the name change records, or multiple files can be used to hold the name change records. Similarly, the deletion of recovery files and backup files can be Performed in different ways.

One skilled in the art should also recognize that there are different ways to initiate the recovery process after a catastrophic failure. For example, instead of the process being initiated by the user attempting to load a new version of a document after a catastrophic failure, a search for recovery files could automatically be conducted upon loading of the operating system or the applicable application software. The recovery process could also be initiated by a specific command from the user.

The method of the present invention could also be used to replace files on one permanent storage medium with files from a different permanent storage medium. Also, different kinds of connected files other than HTML files will occur to one skilled in the art.

Other alternative embodiments will become apparent to those skilled in the art to which an exemplary embodiment pertains without departing from its spirit and scope. Accordingly, the scope of an exemplary embodiment is defined by the appended claims rather than the foregoing description.

What is claimed is:

1. A computer-implemented method for completing a file save operation by replacing original files with replacement files in an HTML document, comprising the steps:
   initiating the file save operation in response to creating the replacement files in the HTML document, wherein the replacement files comprise a main file in which at least one additional file is embedded;
   assigning a temporary name to each replacement file;
   saving the replacement files, each having a corresponding temporary name, from a memory onto a permanent storage medium;
   creating a recovery file comprising information useful for replacing the original files with the replacement files in the event of a catastrophic failure that interrupts the file save operation; and
   replacing the temporary name of each replacement file with a corresponding final name to complete the file save operation, wherein the information of the recovery file comprises a list defining the temporary name and the final name for each replacement file;
   determining whether a catastrophic failure of the file save operation has occurred;
   if a catastrophic failure is detected, then determining if a present filename of one of the replacement files is identical to the corresponding file name listed in the recovery file; and
   if the present filename is not identical to the final name, then replacing the present filename of the replacement file with the final name listed in the recovery file.

2. The method of claim 1, further comprising the step of changing an original name assigned to each original file to a backup name to support a restoration of the assignment of the original name to the original file in the event of a non-catastrophic failure preventing completion of the file save operation.

3. The method of claim 2, further comprising the steps of deleting the recovery file and deleting each original file having a corresponding backup name in response to successfully completing the file save operation.

4. The method of claim 1, further comprising the following steps:
   determining whether a non-catastrophic failure of the file save operation has occurred;
   if a non-catastrophic failure is detected, then determining if a present file name of one of the original files is identical to the corresponding original name; and
   if the present file name is not identical to the original name, then replacing the present filename of the original file with the original name.

5. The method of claim 1, wherein the recovery file comprises a recovery file record, the recovery file record comprising at least one operation byte, the operation byte located at a byte offset from a beginning of the recovery file record, wherein the recovery file is determined not to be intact when the operation byte is set to an invalid value.

6. A computer system for completing a file save operation by replacing original files with replacement files in an HTML document, comprising:
   a permanent storage medium;
   a memory for storing executable program code; and
   a processor, functionally coupled to the permanent storage medium and the memory, the processor being responsive to computer-executable instructions contained in the program code and operative to:
      initiate the file save operation in response to creating the replacement files in the HTML document, wherein the replacement files comprise a main file in which at least one additional file is embedded;
      assign a temporary name to each replacement file;
      save the replacement files, each having a corresponding temporary name, from a memory onto a permanent storage medium;
      create a recovery file comprising information useful for replacing the original files with the replacement files in the event of a catastrophic failure that interrupts the file save operation; and
      replace the temporary name of each replacement file with a corresponding final name to complete the file save operation, wherein the information of the recovery file comprises a list defining the temporary name and the final name for each replacement file;
   determining whether a catastrophic failure of the file save operation has occurred;
   if a catastrophic failure is detected, then determining if a present filename of one of the replacement files is identical to the corresponding file name listed in the recovery file; and
   if the present filename is not identical to the final name, then replacing the present filename of the replacement file with the final name listed in the recovery file.

7. The computer system of claim 6, wherein the processor is further operative to change an original name assigned to each original file to a backup name to support a restoration of the assignment of the original name to the original file in the event of a non-catastrophic failure preventing completion of the file save operation.

8. The computer system of claim 7, wherein the processor is further operative to:
   delete the recovery file; and
   delete each original file having a corresponding backup name in response to successfully completing the file save operation.

9. The computer system of claim 6, wherein the processor is further operative to:
   determine whether a non-catastrophic failure of the file save operation has occurred;
   if a non-catastrophic failure is detected, then determine if a present file name of one of the original files is identical to the corresponding original name; and
   if the present file name is not identical to the original name, then replace the present filename of the original file with the original name.

10. The computer system of claim 6, wherein the recovery file comprises a recovery file record, the recovery file record comprising at least one operation byte, the operation byte located at a byte offset from a beginning of the recovery file record, wherein the recovery file is determined not to be intact when the operation byte is set to an invalid value.

11. A computer readable medium containing computer executable instructions, which when executed on a computer, will cause the computer to perform a method for completing a file save operation by replacing original files with replacement files in an HTML document, the method comprising the steps of:

initiating the file save operation in response to creating the replacement files in the HTML document, wherein the replacement files comprise a main file in which at least one additional file is embedded;

assigning a temporary name to each replacement file;

saving the replacement files, each having a corresponding temporary name, from a volatile memory onto a permanent storage medium;

creating a recovery file comprising information useful for replacing the original files with the replacement files in the event of a catastrophic failure that interrupts the file save operation; and replacing the temporary name of each replacement file with a corresponding final name to complete the file save operation, wherein the information of the recovery file comprises a list defining the temporary name and the final name for each replacement file;

determining whether a catastrophic failure of the file save operation has occurred;

if a catastrophic failure is detected, then determining if a present filename of one of the replacement files is identical to the corresponding file name listed in the recovery file; and if the present filename is not identical to the final name, then replacing the present filename of the replacement file with the final name listed in the recovery file.

12. The computer readable medium of claim 11, further comprising the step of changing an original name assigned to each original file to a backup name to support a restoration of the assignment of the original name to the original file in the event of a non-catastrophic failure preventing completion of the file save operation.

13. The computer readable medium of claim 12, further comprising the steps of deleting the recovery file and deleting each original file having a corresponding backup name in response to successfully completing the file save operation.

14. The computer readable medium of claim 11, further comprising the following steps:

determining whether a non-catastrophic failure of the file save operation has occurred;

if a non-catastrophic failure is detected, then determining if a present file name of one of the original files is identical to the corresponding original name;

if the present file name is not identical to the original name, then replacing the present filename of the original file with the original name.

15. The computer readable medium of claim 11, wherein the recovery file comprises a recovery file record, the recovery file record comprising at least one operation byte, the operation byte located at a byte offset from a beginning of the recovery file record, wherein the recovery file is determined not to be intact when the operation byte is set to an invalid value.

* * * * *